United States Patent [19]
Carney

[11] Patent Number: 5,697,458
[45] Date of Patent: Dec. 16, 1997

[54] DRILLING FLUID PROCESS

[76] Inventor: Leroy Lloyd Carney, P.O. Box 801263, Houston, Tex. 77280-1263

[21] Appl. No.: 643,060

[22] Filed: May 2, 1996

[51] Int. Cl.$^6$ .............................. C09K 7/02; E21B 21/00
[52] U.S. Cl. .............................. 175/65; 175/72; 507/103; 507/135; 507/139; 507/145
[58] Field of Search ................... 175/65, 72; 507/103, 507/106, 120, 135, 136, 137, 138, 139, 145

[56] References Cited

U.S. PATENT DOCUMENTS

| | | | |
|---|---|---|---|
| 3,062,740 | 11/1962 | Reddie et al. | 507/136 |
| 3,558,545 | 1/1971 | Lummus. | |
| 3,561,548 | 2/1971 | Mondshine | 175/65 |
| 3,699,042 | 10/1972 | Browning et al. . | |
| 3,718,585 | 2/1973 | Lummus et al. | 175/65 |
| 3,734,856 | 5/1973 | Son Jr. | 507/139 X |
| 3,760,892 | 9/1973 | Walker | 175/65 |
| 3,880,764 | 4/1975 | Donham | 175/65 |
| 3,899,431 | 8/1975 | Hayes et al. | 507/135 |
| 3,948,782 | 4/1976 | Dreher et al. | 175/65 X |
| 4,012,329 | 3/1977 | Hayes et al. | 175/65 X |
| 4,064,056 | 12/1977 | Walker et al. | 507/109 |
| 4,235,728 | 11/1980 | Schulz et al. . | |
| 4,536,297 | 8/1985 | Loftin et al. | 507/103 X |
| 4,657,593 | 4/1987 | Aignesberger et al. . | |
| 5,094,762 | 3/1992 | Lahalih . | |
| 5,330,015 | 7/1994 | Donche et al. | 175/61 |

*Primary Examiner*—George A. Suchfield
*Attorney, Agent, or Firm*—Michael B. Jolly

[57] ABSTRACT

The use of a water external micellar dispersion as a drilling fluid for rotary and horizontal drilling operations wherein the drilling fluid contains more than 50% oil in the internal phase, improved high temperature stability, high yield points, low gel strengths, and ultra low fluid loss.

13 Claims, No Drawings

DRILLING FLUID PROCESS

BACKGROUND OF THE INVENTION

This invention relates to the preparation and utilization of a unique use for a drilling fluid for use with rotary drilling and more particularly for use with horizontal drilling where drill pipe slides into a borehole with a downhole motor used for rotation of the drill bit the drilling fluid utilizing an oil in water emulsion prepared from water, oil, and an emulsifier. The external phase of the emulsion is water and can be a variety of source waters. The internal phase is oil which amounts to more than 50 percent by volume of the drilling fluid. The oil can be a variety of oils such as crudes, diesels, vegetable oils, poly alpha olefins, etc. The emulsifier is prepared from blending a mixture of alcohol ether sulfates, polyols, and sodium resinates derived from wood resulting in a drilling fluid with improved high temperature stability, and elevated yield points which are easily controllable.

The term "STABLE MUL" will be used throughout this disclosure as referring to the water external oil in water micellar dispersion drilling fluid which is the subject of this application.

Well drilling operations have been shown to be improved by the use of various micellar emulsions. The prior art is replete with drilling fluids utilizing various emulsifying agents.

U.S. Pat. No. 4,536,297 to Loftin el. al. discloses a drilling fluid composed of water, viscosity enhancer, fluid loss reducer, rheology stabilizer, and a water soluble clay-stabilizing organic salt.

U.S. Pat. No. 3,760,892 to Walker discloses a drilling fluid and method of use comprising an aqueous dispersing agent.

U.S. Pat. No. 3,561,548 to Mondshine discloses an emulsion drilling fluid and method for adjusting the osmosity of the aqueous phase of a drilling mud by using inorganic salts so that the mud aqueous phase osmosity equals the aqueous interstitial fluid osmosity.

U.S. Pat. No. 3,558,545 to Lummus discloses a low solids drilling fluid utilizing a pair of polymers use as flocculating agents for clays.

U.S. Pat. No. 3,699,042 to Browning, et. al. discloses a drilling fluid and process comprising an aqueous phase thickening agent, an organic polyelectrolyte ligand and a transition metal component.

U.S. Pat. No. 3,734,856 to Son discloses an oil external micellar dispersion formulated from a petroleum sulfonate emulsifier.

These prior inventions and numerous others offer significant advances in drilling mud technology, however there has never been developed an oil in water drilling fluid which contains at least 50 percent by volume oil in the internal phase while also withstanding high temperatures and providing high yield points, low gel strengths and ultra low fluid loss values.

The applicant has found that use of the STABLE MUL system as a drilling fluid as disclosed provides a fluid with elevated yield points and low gel providing ideal properties for drilling, coring, workover, and completion of wells.

In rotary and horizontal drilling of wells, a string of drill pipe having a drill bit and a bottom hole assemble mounted on the lower end thereof is rotated to cause the bit to create the borehole. A drilling fluid circulated down through a continuously rotating hollow drill string must provide sufficient lubricity, yield point, and thermal stability, in addition to not damaging formation zones. It is most preferable that the drilling fluid allow the drill string to be operated continuously without interruption to maximize the drilling operation economics. The present invention is intended to provide a process for drilling a well utilizing a drilling fluid which accomplishes these objectives.

SUMMARY OF THE INVENTION

It is accordingly an object of the present invention to provide a method a drilling a well using a water external micellar dispersion for use as a drilling fluid on rotary drilling operation and which is exceptionally useful in horizontal drilling operations.

It is a further object of the invention to provide an oil in water micellar dispersion drilling fluid which can withstand high temperatures and which has more than 50 percent oil by volume in the internal phase.

It is a further object of the present invention to provide an oil in water micellar dispersion drilling fluid which has more than 50 percent by volume oil in the internal phase while also remaining stable at elevated temperatures of about 375° F. and also providing high yield points, low gel strengths, and ultra low fluid loss values.

It is a further object of the invention to provide an oil in water micellar dispersion drilling fluid system which allows for easy control and maintenance of the drilling fluid yield point by either adding more oil or water to the fluid either before or during drilling operations.

It is a further object of the invention to provide an oil in water micellar dispersion drilling fluid which demonstrates excellent cleaning capacity of the borehole during drilling of the well and no observed packing-off during drilling operation or settling when out of the hole.

It is a further object of the present invention to provide an oil in water micellar dispersion system for use as a drilling fluid which drilling fluid weighs as low as 7.2 pounds per gallon for easy use upon under-pressured zones.

It is a further object of the present invention to provide an oil in water micellar dispersion for use as a drilling fluid which provides excellent lubricity properties thereby decreasing buildup of torque and drag particularly when sliding a downhole motor said dispersion further decreasing borehole washout, stuck pipes, and fill on bottom.

It is a further object of the present invention to provide an oil in water micellar dispersion for use as drilling fluid which demonstrates stable flow and rheology characteristics when exposed to elevated temperatures above 350° F.

It is a further object of the present invention to provide an oil in water micellar dispersion system for use as a drilling fluid which demonstrates ultra low fluid loss and also acts as a well stimulation fluid.

It is still a further object of the present invention to provide an ecologically safe oil in water drilling fluid system which utilizes ecology safe oils such as canola, palm, caster, soy bean, tung, and poly alpha olefins, etc.

It is still another object of the present invention to provide a drilling fluid emulsion system having an oil/water ratio of at least 70 percent oil and 30 percent water.

It is another object of the present invention to provide a drilling process utilizing a drilling fluid which provides a return of permeability rather than damaging permeability in the production zone.

Applicant's water external micellar dispersion drilling fluid contains between 50 and 90 percent by volume hydrocarbon fluid or oil, between 1 and 10 percent by volume emulsifier, and about 10 to 50 percent by volume water. The resulting emulsion may contain weighting materials such as calcium carbonate, barite, iron oxide, and combinations of such materials. Additionally, the resulting emulsion may contain water phase thickening agents such as high molecular weight sodium poly acrylamide, hydroxyethyl cellulose, and zanthan gums. Furthermore, the water phase may contain organic and inorganic salts. The emulsifier system also contains water soluble resins, alcohol ether sulfonates, and polyols.

DESCRIPTION OF THE INVENTION

While the present invention will be fully described it is to be understood at the outset that persons skilled in the art may modify the invention herein described while still achieving the desired result of the invention. Accordingly, the description which follows is to be understood as a broad informative disclosure directed to persons of skill in the appropriate arts and not as limitations upon the present invention.

The STABLE MUL system is composed of an external water phase and an oil internal phase utilizing an emulsion system comprising alcohol ether sulfonates blended with a polyol and water soluble resonates made from wood resins.

The STABLE MUL system components are premixed with water prior to addition of any hydrocarbon fluids. The water soluble wood resonates made from wood are supplied from Hercules under the tradenames "DRESENATE-TX" and "VINSOL-NVX" and are supplied as the sodium salts of the water soluble resonates. The wood resonates amount to about 14 percent by volume of the premixed emulsion and are added to an amount of water which water amounts to about 55 percent by volume of the total premixed emulsion. Next a product sold by Witco under the tradename "FOAM 3-X" which is an alcohol ether sulfonate blended with a polyol of molecular weight of about 2000 is added to the premix amounting to about 32 percent by volume of the total premixed emulsion. Care should be exercised in the mixing stage of the Witco product to prevent excessive foaming. The preferred concentration of the chemical ingredients of the premixed emulsion should be about 45 percent while the water should be about 55 percent. The premixed emulsifier system is then canned out or drummed out to be shipped to the oilfield for use in making an oil in water emulsion for drilling wells.

In the oilfield the STABLE MUL system is prepared for use as a drilling fluid by first drawing up an amount of water which will result in a final product of about 30 percent water by volume. The premixed emulsion is added to the water at about 20 pounds of premixed emulsion per barrel of final product desired. The amount of the premixed emulsion added can range between 10 and 30 pounds per barrel of final product desired. To the water/emulsion mixture is added the desired hydrocarbon fluid which should amount to about 70 percent by volume of the final product desired. The volume of hydrocarbon fluid can also vary between 50 and 90 percent of the final product.

The water used can be from a variety of sources including brine water, brackish water, and soft water. The hydrocarbon fluid can is most preferable diesel however other oils are suitable including canola oil, soy bean oil, rape seed oil, other vegetable oils, palm oil, caster oil, tung oil, mineral oils, crude oils, and poly alpha olefins.

The emulsion system is controlled or adjusted in the field by adding either water, hydrocarbon fluid or STABLE MUL system emulsion. When hydrocarbon fluid is added to the 70 percent oil emulsion system the yield point increases, while addition of water to the 70 percent oil emulsion system reduces the yield point. Table 2 illustrates the rheology of the emulsion system at varying oil/water ratios. As illustrated in Table 2 the emulsion system gel strength is also controllable by varying oil/water ratios.

The emulsion fluid also experiences ultra low fluid loss which results in borehole wall protection from enlarging during drilling and no shale problems have been observed using the emulsion system. Additionally, permeability studies have demonstrated the positive effects from the use of the emulsion system as compared to other drilling mud systems. Table 3 illustrates return permeability studies indicating a 110 percent return for the STABLE MUL emulsion system, as compared to other drilling mud systems.

The STABLE MUL system also exhibits thermal stability even up to 350° F. Table 4 illustrates rheology for the STABLE MUL system at various temperatures both before and after hot rolling.

Table 1 illustrates the STABLE MUL systems stability at various concentrations of solids and compares the rheology and filtrate of STABLE MUL at different concentrations of solids with heat aging. It is contemplated that solids may be removed from the STABLE MUL system using known solid removal equipment, thus recovering the STABLE MUL system for reuse.

The density of the STABLE MUL system can be varied between 7.2 pounds per gallon and above 12 pounds per gallon by the addition of various weighting agent already known to the art including calcium carbonate, barite, and iron oxides.

Aqueous phase viscosity enhancing agents may also be employed for use with the STABLE MUL system such as high molecular weight sodium polyacrylamide, hydroxyethylcellulose, or zanthan gums.

I claim:

1. A process of drilling a well utilizing a circulating drilling fluid, comprising the steps:

a) preparing a water external micellar dispersion from a mixture of water soluble resins, ethoxylated alcohol ether sulfonates and polyols, said micellar dispersion comprising about 10 to 50 volume percent water, about 1 to 10 volume percent emulsifier, and about 50 to 90 volume percent hydrocarbon fluid in the internal phase, b) circulating said water external micellar dispersion downhole of a rotary drilling operation.

2. The process of claim 1 wherein the emulsifier in step (a) is prepared from a mixture of the sodium salt of water soluble wood resonates, alcohol ether sulfonates blended with a polyol of molecular weight of about 2000.

3. The process of claim 1 wherein the preparation of the water external micellar dispersion further comprises the steps:

a) adding about 1 to 10 volume percent the sodium salt of water soluble wood resonates, to about 10 to 50 volume percent water, b) adding about 1 to 10 volume percent alcohol ether sulfonates blended with a polyol of molecular weight of about 2000 to the sodium salt of water soluble wood resonates from step (b), c) adding about 50 to 90 volume percent a hydrocarbon fluid to the mixture from step (b).

4. The process of drilling a well utilizing a circulating drilling fluid, comprising the steps:

a) preparing a water external micellar dispersion said micellar dispersion preparation comprising the steps:

i) adding a mixture of water soluble wood resonates amounting to about 1 to 10 volume percent of the dispersion to water said water amounting to about 10 to 50 volume percent of the dispersion, ii) adding a mixture of an ethoxylated alcohol ether sulfonate and polyol to the mixture from step (i) said mixture amounting to about 1 to 10 volume percent of the dispersion, iii) adding a hydrocarbon fluid comprising diesel oil to the mixture in step (ii) said diesel oil comprising the internal phase of said micellar dispersion and further amounting to about 50 to 90 volume percent of the dispersion, b) circulating said water external micellar dispersion downhole of a rotary drilling operation.

5. The process of drilling a well utilizing a water external micellar dispersion as in claim 4 wherein said process further comprises a means for preventing a decrease in permeability of the production zone substrate, said means further comprises circulating downhole the micellar dispersion of claim 4.

6. The process of claim 4 wherein the mixture of water soluble wood resonates in step (i) is prepared from a mixture the sodium salt of the water soluble wood resonates.

7. The process of claim 4 wherein the mixture of an ethoxylated alcohol ether sulfonate and polyol in step (ii) is blended with a polyol of molecular weight of about 2000.

8. The process of claim 4 wherein the hydrocarbon fluid is selected from the group of oils consisting of diesels, castor, rape seed, mineral oils, canola, palm, caster, soy bean, tung, crude oils and refined fractions of crude oil, partially refined fractions of crude oil, refined fractions of crude oil, vegetable oils, and poly alpha olefins.

9. The process of claim 4 wherein the water used further includes inorganic salts and minerals.

10. The process of claim 4 wherein the prepared micellar dispersion further includes weighting agents in a quantity sufficient to increase the density thereof to a level in the range from about 7.2 to above 12 pounds per gallon of said dispersion.

11. The process of claim 4 wherein the internal hydrocarbon fluid phase further includes organic salts, organic polymers, and inorganic salts.

12. The process of claim 4 wherein the water phase further comprises a viscosity increasing agent.

13. The process of claim 4 wherein the water phase further comprises a fluid loss control substance.

* * * * *